UNITED STATES PATENT OFFICE.

WILLIAM GODSON LINDSAY, OF NEWARK, NEW JERSEY, ASSIGNOR TO THE CELLULOID COMPANY, A CORPORATION OF NEW JERSEY.

NON-INFLAMMABLE CELLULOSE COMPOUND.

1,319,229.   Specification of Letters Patent.   Patented Oct. 21, 1919.

No Drawing. Original application filed May 5, 1909, Serial No. 494,178. Divided and application filed September 10, 1912, Serial No. 719,543. Divided and application filed September 1, 1916, Serial No. 118,003. Divided and this application filed March 9, 1918. Serial No. 221,549.

*To all whom it may concern:*

Be it known that I, WILLIAM GODSON LINDSAY, a citizen of the United States, residing at Newark, in the county of Essex and State of New Jersey, have invented certain new and useful Improvements in Non-Inflammable Cellulose Compounds, of which the following is a specification.

This invention relates to a new composition of matter which is non-inflammable, and which possesses permanently great strength and tenacity, and can be used as a substitute for nitro-cellulose compositions, such as celluloid and similar substances, and also to the process of making the same. The present application is a division of my application, Serial No. 118,003, filed September 1, 1916, which in turn is a division of my application, Serial No. 719,543, filed September 10, 1912, which has eventuated as Patent No. 1,199,798, dated October 3, 1916, said application being in turn a division of my application, Serial No. 494,178, filed May 5, 1909, which has eventuated as Patent No. 1,050,065, dated January 7, 1913.

Heretofore, it has been proposed to substitute acetyl cellulose for nitro-cellulose for the purpose of obtaining a non-inflammable material having the properties of celluloid, but so far as I am aware prior to my invention such compounds have been unsuccessful.

I have discovered that triphenylphosphate and certain other substances can be combined with acetyl cellulose to produce a non-inflammable compound having great strength and tenacity, and other valuable properties, and the present invention is designed to point out to the operator a practical method of using or combining these two substances in making films and other forms of such compounds. So far as I know, I am the first, not only to use triphenylphosphate with acetyl cellulose, but I am also the first to discover the method of making a useful product or compound containing acetyl cellulose and triphenylphosphate.

In carrying out my invention, I preferably select an acetyl cellulose which is soluble in acetone; although I do not confine myself to this particular variety of acetyl cellulose, for others may be used. A solution is made of the acetyl cellulose in acetone or other suitable solvent and to this solution is added triphenylphosphate, either in solid form or previously dissolved in acetone or other similar solvent. I also add 10 to 25 parts of dichlorhydrin (or its hereinafter specified equivalent). The amount of triphenylphosphate may be varied in proportions from ten to twenty parts by weight to each one hundred parts of the acetyl cellulose, and the acetone or other suitable solvent is added in sufficient quantity to make either a flowable solution or a plastic mass, as is well understood by those skilled in the art; but I do not limit myself to any specific proportions because they may be diminished or increased as desired.

The degree of strength and tenacity of the product will depend upon the variety of acetyl cellulose employed in solution or in combination or mixture as the basic ingredient; but the addition of triphenylphosphate increases both the strength and tenacity and also insures non-inflammability. This increase in strength and tenacity may, as I have found by experiment, be secured in greater or less degree by substances which are to a large extent equivalents of triphenylphosphate, such as diphenylamin, trichlorphenol, tricresylphosphate, and, to a lesser extent, phenylsalicylate. I prefer, however, the triphenylphosphate because, while it imparts non-inflammability to the compound, it does not impart any color or odor to the product. Again as indicated, I may use other menstrua or solvents than acetone, such, for instance, as chloroform, ethyl acetate or acetylene tetrachlorid, which, either alone or when two or more of them are mixed together, are capable of dissolving the acetyl cellulose in the presence of triphenylphosphate or other substances indicated above. I have also found that it may be useful in some cases to use alcohols in the solvent mixture both for the purpose of causing fluidity and for regulating the evaporation of the solvent.

As indicated above, the solvent or menstruum may be formed of one or more substances in addition to, or in substitution of, acetone; in fact, any one or more of the solvents or menstrua of an acetyl cellulose, or similar cellulose compositions, may be employed, provided the solvent is also a solvent of the triphenylphosphate or other substance used in place thereof.

A further advantage in employing these solvent or menstrua substances in the case of some of the heavy solvents arises from their property of restraining or modifying the volatility of the mixture; acetylene tetrachlorid, when used alone, or with chloroform, alcohol, ethyl acetate or the like, in varying proportions, is especially useful in this connection. In place of dichlorhydrin I may use diacetic ether, benzoic ether, aceto-dichlorhydrin, or any slowly volatile solvent of acetyl cellulose which is capable of dissolving or liquefying triphenylphosphate, or its specified equivalent, in the presence of acetyl cellulose. By preference, however, I use dichlorhydrin, for its action exemplifies in the highest possible manner the combination principles referred to.

The addition of 1½% urea will insure permanency of strength and tenacity to the compound. The proportion of urea or equivalent substance will vary according to the desired degree of stability of final product. A proportion of two parts urea to one hundred parts of the cellulose compound gives most excellent results; a less proportion is sufficient for ordinary purposes. I have obtained satisfactory results with a proportion of urea as low as one part of one hundred parts of the cellulose compound.

For certain purposes, it is advantageous to make a thorough mechanical mixture containing the acetyl cellulose and triphenylphosphate, or equivalent substances, and subsequently add the solvent or liquid menstruum.

The product made in accordance with my invention can be made in the form of films or thin sheets. Any approved method of forming films or thin sheets from a flowable solution may be employed. It will be understood, also, that the flowable solution formed as above described may be applied as a protecting surface, such a coating possessing also the property of being waterproof. The final product may also be made in the form of a mass of any desired thickness. It will be obvious that suitable pigments or coloring matter may be added to the above mixture or solution to produce a final product for use in imitating other substances, such as amber, ivory, horn, marble, or the like.

Where I employ the expression "acetyl cellulose soluble in acetone" in the claims, it is to be understood that I mean such variety of acetyl cellulose which is freely soluble in acetone, and that this variety of acetyl cellulose is substantially completely soluble in acetone.

Having thus described my invention, I declare that what I claim as new and desire to secure by Letters Patent is:

1. A composition of matter containing an acetyl cellulose and phenylsalicylate in admixture with a solvent common to both.

2. The process of making a composition of matter which consists in combining an acetyl cellulose and phenylsalicylate by the use of a solvent common to both.

3. A composition of matter containing acetyl cellulose and phenylsalicylate.

4. A composition of matter containing an acetyl cellulose soluble in acetone and phenylsalicylate.

5. A composition of matter containing an acetyl cellulose soluble in acetone, phenylsalicylate and a solvent common to both.

6. A composition of matter containing acetyl cellulose, phenylsalicylate, dichlorhydrin and a solvent for said cellulose composition and said phenylsalicylate.

7. A composition of matter containing an acetyl cellulose and phenylsalicylate in admixture with a solvent for said cellulose composition and said phenylsalicylate, comprising two or more solvents, one of which is more slowly volatile than the other.

8. A composition of matter containing an acetyl cellulose, phenylsalicylate and urea.

9. The process of making a composition of matter which consists in combining acetyl cellulose and phenylsalicylate by the use of a solvent mixture composed of two or more solvents, one of which is more slowly volatile than the other and at least one of which solvents is common to both the acetyl cellulose and the phenylsalicylate.

10. The process of making a composition of matter which consists in combining an acetyl cellulose and phenylsalicylate by the use of a solvent mixture comprising dichlorhydrin and a solvent for said acetyl cellulose and said phenylsalicylate.

11. The process of making a composition of matter which consists in combining an acetyl cellulose soluble in acetone and phenylsalicylate by the use of a solvent mixture comprising dichlorhydrin and acetone.

WILLIAM GODSON LINDSAY.